United States Patent [19]
Grimble et al.

[11] Patent Number: 5,241,536
[45] Date of Patent: Aug. 31, 1993

[54] BROADBAND INPUT BUFFERED ATM SWITCH

[75] Inventors: Kenneth N. Grimble; Keith D. Anderson, both of Nepean, Canada

[73] Assignee: Northern Telecom Limited, Montreal, Canada

[21] Appl. No.: 770,214

[22] Filed: Oct. 3, 1991

[51] Int. Cl.⁵ .............................................. H04L 12/56
[52] U.S. Cl. ................................... 370/60.1; 370/94.1; 370/59
[58] Field of Search ................ 370/60, 60.1, 94.1, 370/94.2, 66, 68.1, 59

[56] References Cited

U.S. PATENT DOCUMENTS

| | | | |
|---|---|---|---|
| 4,922,488 | 5/1990 | Niestegge | 370/60 |
| 4,947,387 | 8/1990 | Knorpp et al. | 370/60 |
| 5,126,999 | 6/1992 | Munter et al. | 370/60 |
| 5,130,975 | 7/1992 | Akata | 370/60 |
| 5,157,654 | 10/1992 | Cisneros | 370/60 |

OTHER PUBLICATIONS

"Network, Transport and Switching Integration for Broadband Communications" by J. Y. Hui, IEEE Network, Mar. 89, pp. 40-51.
"Input Versus Output Queueing on a Space-Division Packet Switch" by M. J. Karol et al, IEEE Transactions on Communications, vol. COM-35, No. 12, Dec. 87, pp. 1347-1356.
"Large-Scale ATM Multi-stage Switching Network with Shared Buffer Memory Switches" by Y. Sakurai et al, IEEE Communications Magazine, Jan. 91, pp. 90-96.

Primary Examiner—Benedict V. Safourek
Assistant Examiner—H. Kizou
Attorney, Agent, or Firm—Yoshiharu Toyooka

[57] ABSTRACT

Broadband ATM switches for switching ATM packetized data in timeslots are disclosed. In one embodiment, the switch includes input buffer, a space switch for connecting input ports and output ports at successive timeslots and a system scheduler. The timeslot utilization processing is carried out by using a content addressable memory. A bit map is provided for registering the timeslot utilization of the input ports and the output ports. An encoder determines the earliest commonly available timeslot for connecting input ports and their requested output ports. There is further disclosed an architecture in which groups of input ports share common buffer memories and in which the system scheduler processes grouped inputs, thus taking advantage of the architecture's similar characteristics and advantages to those of the common memory switch.

12 Claims, 6 Drawing Sheets

BROADBAND INPUT BUFFERED ATM SWITCH

FIELD OF THE INVENTION

The present invention relates generally to broadband telecommunication switching and, in particular, it is directed to high speed ATM packet switches using novel input buffered switches.

BACKGROUND OF THE INVENTION

Among many texts on the broadband multiplexing and switching technologies, a good description on the subject is found in an article entitled "Network, Transport, and Switching Integration for Broadband Communications" by Hui in IEEE Network, March 1989, pp 40-51. The article gives an overall picture of STM and ATM technologies. It also mentions a few criteria which should be taken into consideration in choosing the type of switching and multiplexing format.

Generally, in a broadband packet switching system, the switch core provides high bandwidth interconnect between peripherals. Among many switch core architectures, the input buffered switch, the output buffered switch, and the common (shared) memory switch are popular.

In the input or output buffered switch, there is a memory buffer for each channel located either at the input or the output, and a space switch (crosspoint array switch, self-routing circuit switch etc.) to provide the switching. In the input buffered switch, for each cell period one cell is picked from each buffer and switched through the space switch to an output as defined in the header of the cell. In the output buffered switch, on the other hand, the cell is switched through the space switch and then buffered at the output. Some common difficulties with the input or output buffered scheme, in an ATM or ATM/STM hybrid environment, are how to control a large bandwidth system, deal with input and/or output contention, and deal with multicast on the fly. Queueing at the output, as in the output buffered space switch, improves the performance over the input buffered scheme. This is shown in the article by Karol et al in the IEEE Transactions on Communications, Vol. COM-35, No. 12, December 1987, pp 1347-1356, entitled "Input versus Output Queueing on a Space-Division Packet Switch". As reported in the article, a thorough comparison of input versus output queuing on an N×N non-blocking space division packet switch indicates that better performance results with output queuing than with input queuing.

The common memory switch core appears to be more attractive than either of the above schemes because of its very simple control concept, its smaller memory size, and it is generally non-blocking. Unlike the input and output buffered switches, the memory of the common memory switch is shared by (or common to) all the input and output ports. Any cell location in memory can be accessed by any input or output port. In general, the controller of such a switch can direct any input or output port to write or read, respectively, into or from any memory location of the cell buffer. This dynamic allotment and non-blocking access capability lends this common memory switch architecture its name, "shared" or "common" buffer memory switch. U.S. Pat. No. 4,603,416, issued Jul. 29, 1986 (Servel) describes the basics of the common memory switch.

In the input or output buffered switch, where separate memories are used for each channel, sufficient memory must be provided for each channel in order to meet the blocking specifications of the switch. The common memory, on the other hand, does not need to reserve large amounts of memory for low traffic channels and as such needs significantly less total memory to meet the same blocking specification. The controller for the common memory switch can be as simple as a FIFO for each output port where the entries into it are pointers to cells destined to that output.

Among various ways of expansion which have been proposed for the above schemes, one popular approach for expansion for the common memory switch is described in the article by Sakurai et al in IEEE Communications Magazine, January 1991, pp 90-96, entitled "Large-Scale ATM Multistage Switching Network with Shared Buffer Memory Switches". It suggests a matrix of a plurality of unit common memory switch modules arranged in multi-stages. For example, each unit module handles a small number of ports (i.e. 32) and in a matrix, the system can grow to several hundred ports. However, matricing creates new blocking problems which are not easily managed. Expanding the unit module instead, requires a memory array which becomes significantly more difficult to design. On the other hand, with the conventional expansion techniques, the input buffer scheme has typically been restricted by controller complexity and the implementation of switching restrictions (i.e. no two packets from the same source at one time). The output buffer alternative requires a high input bandwidth to handle data from multiple sources.

The present invention attempts to solve the above-mentioned problems associated with the large input buffered switch.

OBJECTS OF THE INVENTION

It is therefore an object of the invention to provide an improved input buffered switch for ATM switching.

It is another object of the present invention to provide the design and implementation of a controller for an ATM input buffered space switch system.

It is still another object of the present invention to provide a high speed broadband switching system which includes common memory buffer units used as grouped input ports to a space switch.

It is yet a further object of the present invention to provide variations of the above-mentioned controller when common memory switch units are used as input ports to a space switch.

It is an object of the present invention to provide further variations of the controller to manage bandwidth allocation of a junctured space switch.

SUMMARY OF THE INVENTION

According to another embodiment, the present invention is directed to an ATM switching system for switching data composed in ATM cells between a plurality of input ports and a plurality of output ports in timeslots according to the header of each cell. The system comprises buffer memory means for storing cells of data from the plurality of input ports and space switch means for connecting the input ports and the output ports for each cell. Timeslot utilization means is connected to the buffer memory means and includes an input port utilization array and an output port utilization array which indicate usage of the future timeslots of each input port and output port respectively. The system further includes a revolving window priority encoder means for determining the earliest common timeslot among the future timeslots for connection between an input port and one or more output ports selected according to the header of a cell stored in the buffer memory means. The list controller means is connected to the buffer memory means, the timeslot utilization means and the space switch means. The list controller means stores the earliest common timeslot together with information about the input port and selected output ports and configures the space switch means at every timeslot according to the header of each cell.

DETAILED DESCRIPTION OF THE PREFERRED EMBODIMENTS

Figure 1:
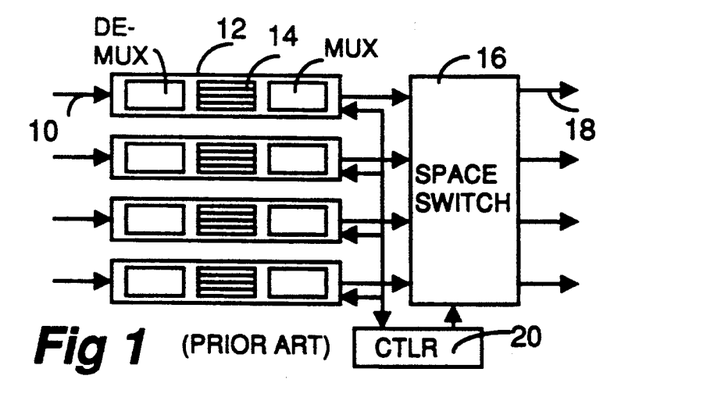
FIG. 1 is a block diagram of a prior art 4×4 input buffered switch.
Figure 2:
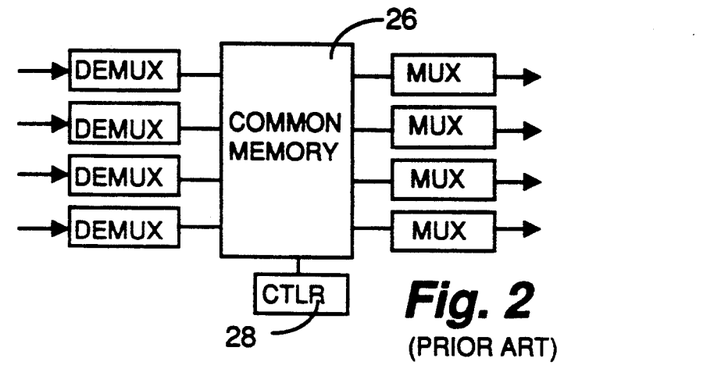
FIG. 2 is a block diagram of a prior art 4×4 common memory switch.

Referring to the accompanying drawings, FIGS. 1 and 2 illustrate, in block diagram, a known 4×4 input buffered switch and a known common memory switch respectively. In FIG. 1, the switch includes four input ports 10 and input buffer means 12 for each port, which includes a buffer memory 14. A 4×4 space switch 16 (e.g. a crosspoint array) carries out the function of switching to four output ports 18 and switch controller 20 coordinates the input buffer means and the space switch. In a 4×4 common memory switch shown in FIG. 2, a single memory buffer 26 is provided for all four input and output ports and controller 28 coordinates the system. Multiplexers and demultiplexers have been illustrated in the figures but are not necessarily required for either switch architecture. When the switch requires a large bandwidth, and subsequently more ports, the switch controller for the input buffered switch becomes complicated and the buffer memory of the common memory architecture becomes difficult to interconnect.

The present invention addresses the problems associated with building a large switch by proposing solutions applied to the input buffered switch. The solutions involve the sharing of memory buffer by several input ports and the dealing with an output connection list. They lead to less memory requirements, improved performance during high traffic periods and better blocking characteristics of the system.

Figure 3:
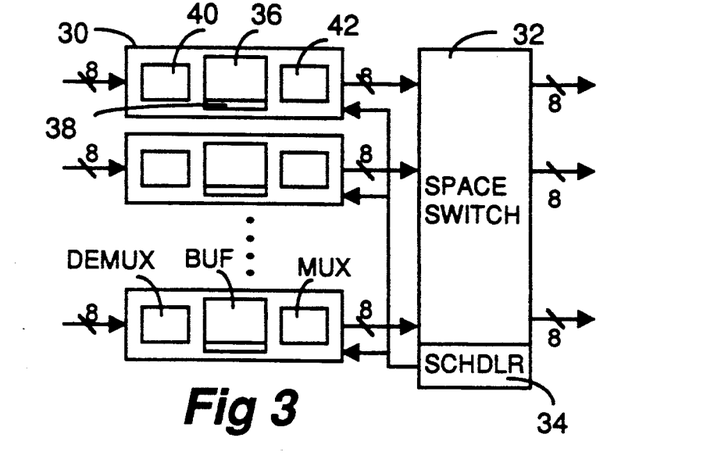
FIG. 3 is a block diagram of an input buffered switch in which input ports are grouped according to one embodiment of the present invention.

FIG. 3 shows an input buffered switch, according to one embodiment of the present invention in which a group of input ports can share a common memory rather than having separate memories for each channel. The common memory in this architecture provides two advantages to the overall switch as compared to the single port input buffer scheme. Firstly, the memory requirements for N ports sharing a common memory can be significantly lower than a system employing an independent memory for each port. Secondly, as a source of data to the space switch, cells are no longer directly associated with a specific input port but are grouped to provide a better statistical switch availability. In other words, any cell in memory can be output on any output of that group, thus reducing the blocking problems normally associated with the known input buffered architecture. Improvement on memory and availability is apparent when as few as two ports are grouped. As the number of ports sharing the common memory increases, the memory and availability advantages become less significant. The number of ports grouped together is somewhat irrelevant, and in this example, 8 ports have been chosen to provide a suitable memory and availability advantage as well as to reflect a preferred packaging density.

Referring back to the Figure, there is shown a 64×64 grouped input buffered space switch which comprises 8 port cards (common memory buffer module) 30, a 64 port space switch 32, and a switch scheduler 34. Each port card 30 is a common memory unit handling 8 ports. It contains a common memory buffer 36 and its controller/buffer pointer manager 38 in addition to, if required, demultiplexers 40 and multiplexers 42 for each of the 8 ports. The space switch 32 can be of any type so long as the system controller 34 is designed to match the space switch and the grouped input buffer.

This common memory buffer module can, in most respects, be identical to the common memory system described earlier. It can store cells and can be capable of switching them without an external controller or space switch. When only a few ports are required (e.g. 2 to 8 ports), a single common memory buffer module would suffice and the space switch would not be required. In this case, the common memory module would be a complete and functional ATM switch. However, as the switch grows beyond 8 ports, additional common memory modules, a space switch, and a scheduler are provided to accommodate the larger system requirements. In the expanded system, each common memory buffer module appears as a grouped input buffer to an input buffered space switch. Each of the common memory buffer modules manages the memory, the input ports, and the output ports of the same group. However, each grouped input buffer can no longer operate independently. A system-wide controller/scheduler must coordinate switching through the space switch.

Figure 4:
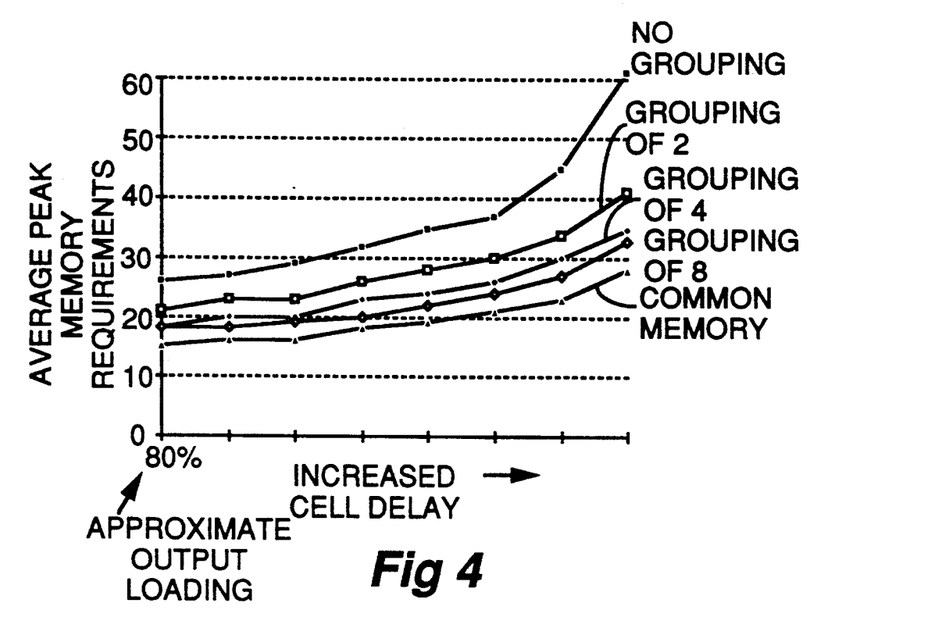
FIGS. 4 and 5 are graphs showing memory requirements and average cell delays for the switch shown in FIG. 3.
Figure 5:
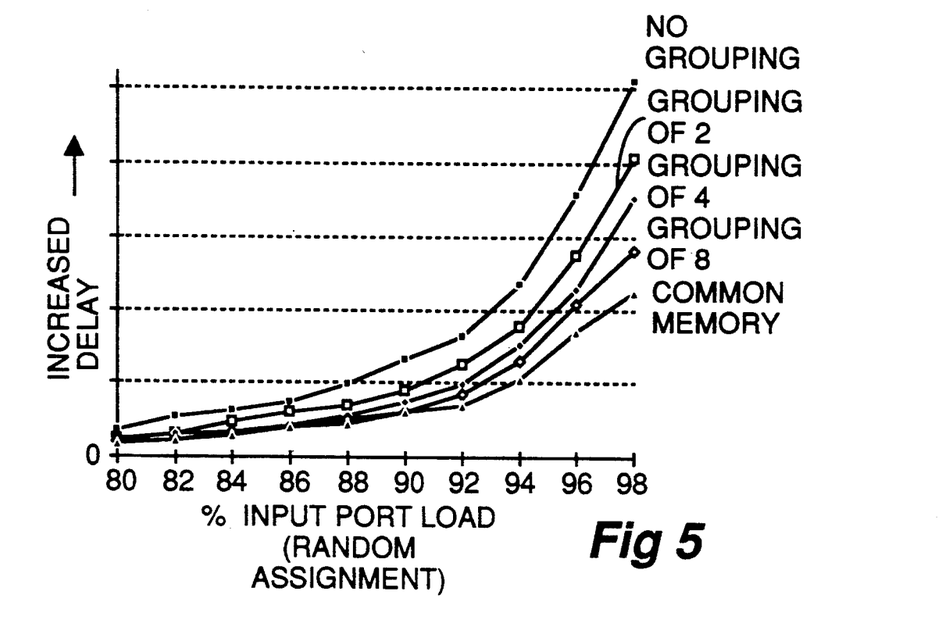

FIG. 4 illustrates total memory requirements for a typical 64 port input buffered switch, input buffered switches using 2-, 4- and 8-channel grouping and a 64 port common memory switch. Peak memory requirements on non-grouped buffers are more susceptible to demands of bursty channels. Similarly, FIG. 5 illustrates the average cell delays going through the similar switches as the switch demand increases. As seen in these examples, the behaviour of the grouped input buffered switch more closely resembles that of the common memory design whose memory is shared by all channels and where cell delay is based only on output contention and not internal blocking. Simulations with several types of space switches (e.g. crosspoints, three stage junctured switch, Batcher-banyon switch) have each indicated similar advantages.

In aid of understanding further embodiments to be described below, the output queue controller of the known common memory switch is analyzed first. The basic requirements for the output queue controller can be defined in the following way. Assume that the following sequence of cells arrive at the input ports (A, B, C, D) going to the output ports (1, 2, 3, 4) listed, where A1 represents the first cell arriving at A, A3 represents the third cell arriving at A, and so on:

| A1 | going to | 4 |
|----|----------|---|
| B1 | ...      | 3 |
| C1 | ...      | 2 |
| D1 | ...      | 1 |
| A2 | ...      | 3 |
| B2 | ...      | 3 |
| C2 | ...      | 2 |
| D2 | ...      | 2 |
| A3 | going to | 1 |
| B3 | ...      | 1 |
| C3 | ...      | 4 |
| D3 | ...      | 3 |

If these items were placed directly into the output queues as they could be in the common memory scheme, the queues would appear as:

| Timeslot | 1  | 2  | 3  | 4  |
|----------|----|----|----|----|
| N        | D1 | C1 | B1 | A1 |
| N + 1    | A3 | C2 | A2 | C3 |
| N + 2    | B3 | D2 | B2 |    |
| N + 3    |    | D3 |    |    |

In a common memory switch, the cells as listed could be output on ports 1 through 4 without any difficulty. However, for an input buffered switch a fundamental restriction dictates that no input source can provide more than one cell to the space switch in any one timeslot. Timeslots N+1 and N+2 violate this rule. Obviously, items cannot be placed directly into output queues of an input buffered switch.

If the output queue is visualized as a list instead of a queue and a circuit is used to implement a rule that restricts an item from being placed in a position where the same source has previously been placed in the same row (timeslot) then the list would appear as follows:

| Timeslot | 1  | 2  | 3  | 4  |
|----------|----|----|----|----|
| N        | D1 | C1 | B1 | A1 |
| N + 1    | B3 | C2 | A2 |    |
| N + 2    | A3 | D2 | B2 | C3 |
| N + 3    |    | D3 |    |    |

The result is a solution where each input is only used once per timeslot. It should be noted that the switch is equally as efficient as before but the idle periods have moved. It should further be noted that A3 and B3 have been reversed in order. This has served to maintain the efficiency and will not cause any reordering of cells from a specific source to a specific destination. Because input ports A, B, and C in timeslot N+1 are already assigned, only port D can be assigned to output port 4 in timeslot N+1. If at any time, before timeslot N+1 is used, a cell arrives at input port D for output port 4, then it would be placed in timeslot N+1 without violating requirements regarding maintenance of cell order.

The rule for this implementation is very simple but the application of it as the switch gets large is not so obvious, particularly in consideration of the speed requirements. For example, in the case of the controller of a 64×64 input buffered switch with a maximum queue depth of 256, the array, written in the same fashion as above, would be 64×256

|     | 1 | 2 | 3 | 4 | ... | 64 |
|-----|---|---|---|---|-----|----|
| 1   | • | • | • | • |     | •  |
| 2   | • | • | • | • |     | •  |
| 3   | • | • | • | • |     | •  |
| •   |   |   |   |   |     |    |
| •   |   |   |   |   |     |    |
| •   |   |   |   |   |     |    |
| 256 | • | • | • | • |     | •  | where each • is a 6 bit value representing the port number of the data source. To place an item in this array, search vertically in the desired output queue as many as 256 positions for an opening and at the same time verify in the horizontal row of that opening that the 6 bit source value has not already been used. Done in this manner, the controller would be very slow from searching sequentially or very large to accommodate the required comparators.

Figure 6:
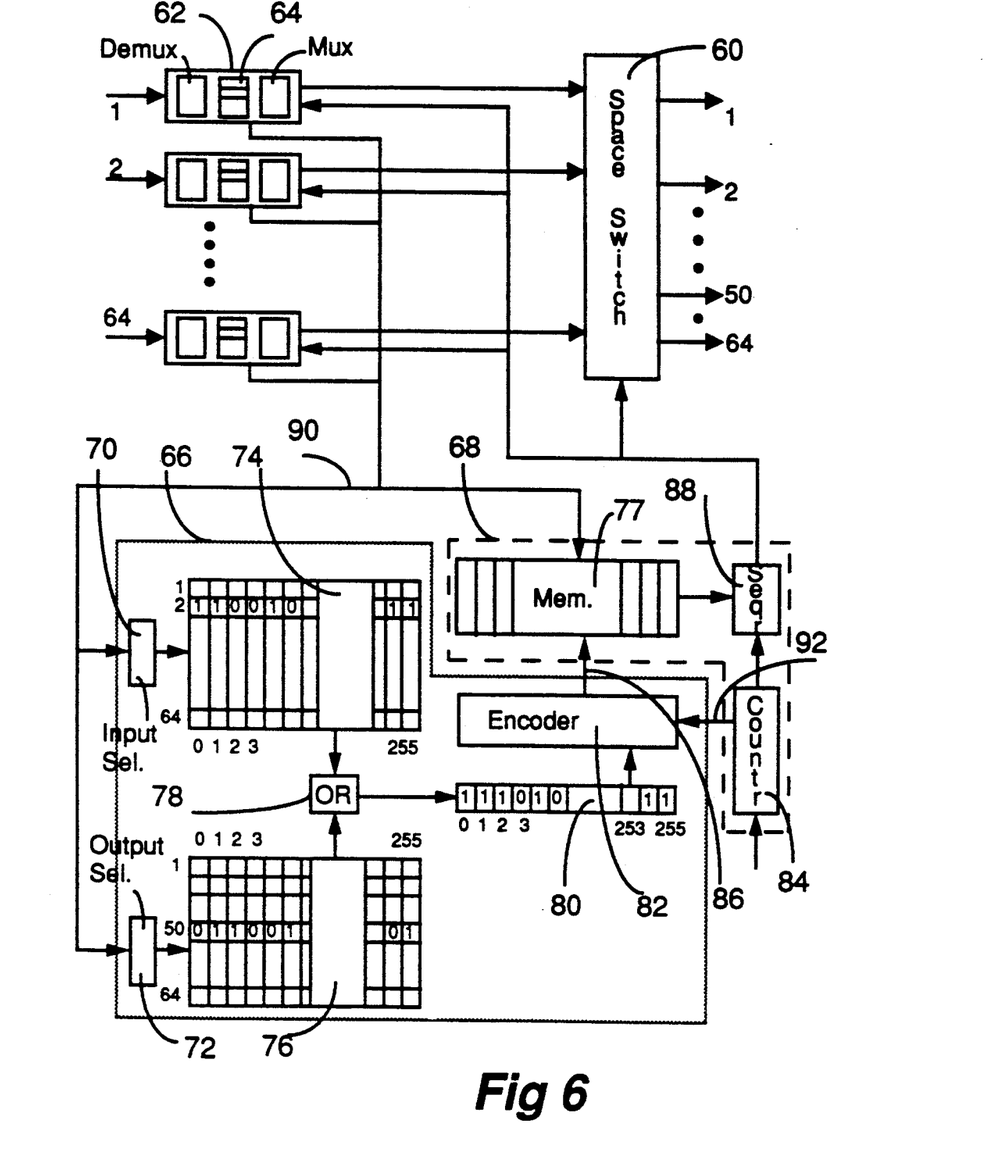
FIG. 6 is a detailed block diagram of an input buffered switch system which uses the timeslot utilization schedular according to another embodiment of the present invention.

The present invention obviates the above problems associated with large, high bandwidth input buffered switches, by separating the list function and the search function. FIG. 6 shows schematically a 64×64 port input buffered switch according to one embodiment of the present invention. A space switch 60 (e.g. a 64×64 crosspoint array) and input buffer means 62 are similar in construction and functionality to those shown in FIG. 1 except for the difference in the number of ports.

A cell arriving at an input port contains, among other things (e.g. payload data), a header with destination information. Upon arrival at the switch, each cell is processed by the input buffer means 62 and is stored in the buffer memory 64 located in the input buffer means. There, the cell awaits a future timeslot at which time it is sent through a space switch array to one or more requested output ports. At the same time the destination information, taken from the header of the cell, along with an indication of the input port number is passed to the timeslot utilization means 66. The results from the timeslot utilization means along with the input port number and destination information are passed to the list controller means 68 where it is stored for future use. At the appropriate time, the connection information is retrieved from the list controller means 68. The cell pointer is sent to the input buffer means 62 where the cell is retrieved from the buffer memory and sent on its outgoing link through the space switch 60. At the same time, the list controller means 68 may provide to the space switch 60 an indication of the routing required for that cell. This function is not required if the space switch is self-routing.

As seen in FIG. 6, this scheduler, whose functions are described above, has two major functional blocks: the timeslot utilization means 66 and the list controller means 68. In particular, the timeslot utilization means 66 directs the information about the input port number to the input row selector 70 and the information about the requested output port number to the output row selector 72. The row selectors select the indicated rows of bit maps called the input port utilization array 74 and the output port utilization array 76 respectively. The input port utilization array 74 and the output port utilization array 76 represent the utilization status of the input ports and the output ports respectively. Each row of the utilization memories (bit map memories) contains status information for an input or output port where each bit within the row represents the status of that port in a future timeslot. When a row is selected from either array, the status of a port is accessed. A set bit in the accessed row indicates that a connection involving that port has been listed in the list controller memory means 77 of the list controller means 68 for that corresponding timeslot. When a row from the input port utilization array 74 and a row from the output port utilization array 76 are selected, a logic unit 78 ORs the corresponding bits in the vertical plane of the selected rows. The logic unit 78 could be gates or could simply be the wire-ORed outputs of the two arrays. A timeslot utilization status indicator 80, which is the result of logical OR unit 78, is an indication of future timeslots where both the input and output ports are available for use. A set bit in the indicator 80, for any timeslot, indicates that either the input port or the output port, or both, are busy during that timeslot. The indicator 80 is symbolically shown in the Figure but it is actually the result of the OR function and is the data used by the revolving window priority encoder 82. A cyclic system timeslot counter 84 produces a current timeslot number which is available to the revolving window priority encoder 82. The encoder locates the first timeslot where neither input nor output port is busy (logical 0 in this instance), beginning with the timeslot immediately following the current timeslot. The output of the revolving window priority encoder 82 is a binary number representing the earliest idle timeslot common to the input and output ports. This output of the revolving window priority encoder, together with the input and output port indicators, is sent to the list controller means 68 through line 86 for storage in the list controller memory means 77 until the indicated timeslot arrives. On each increment of the system timeslot counter 84, the configuration sequencer 88 retrieves the connection information for that timeslot from the list controller memory means 77 and prepares the necessary components of the system for the cell transfer.

For example, referring further to FIG. 6, the header of an incoming cell on input port 2 may indicate that the cell is destined for output port 50. The input buffer means derives information about output port 50 from the header of the incoming cell and sends signals on path 90 to cause the timeslot utilization controller means 66 to select row 2 in the input port utilization array 74 and row 50 in the output port utilization array 76. These respective rows may, for example, have the entries illustrated in the Figure. The entries in the bit map memories are either one or zero, indicating whether the timeslot has already been assigned to another cell. The logic unit 78 ORs these entries, resulting in timeslot utilization indication 80. Information on path 92, indicating slot 253 as the current timeslot number, is provided to the revolving window priority encoder 82 from the system timeslot counter 84. Beginning with the next timeslot after the current timeslot (slot 254) and ending at the timeslot number prior to the current timeslot (slot 252), the revolving window priority encoder 82 searches the timeslot utilization status indicator 80 for the earliest timeslot available in which both the input and output ports are "not busy". The searching in the timeslot utilization status indicator 80 is carried out in a wrap-around fashion, that is to say, slot 0 follows slot 255. The results of the revolving window priority encoder 82 of the example indicate that timeslot number 3 (6 timeslots from the current system timeslot) is the earliest that a connection can be made between the input and output ports. An indication of timeslot 3, as well as the indicators of input port 2 and output port 50, are passed to the list controller means 68 where the information is stored in the list controller memory means 77 for future use, at a location specific to connections of timeslot 3. At the same time, the status bit representing input port 2, timeslot 3, and the status bit representing output port 50, timeslot 3, are set to busy to ensure that neither is reused in that timeslot. Six timeslots later, when the system timeslot counter 84 is 3, the configuration sequencer 88 will prepare a path between input port 2 and output port 50 and inform input port 2 to send the cell for output 50. At the end of timeslot 3, when the connection list has been read to the configuration sequencer 88, the entries corresponding to that timeslot in the timeslot utilization arrays 74 and 76 are reset to "not busy" and the list items for timeslot 3 can be deleted from the list controller means 68.

Therefore, in this embodiment, the list function and the search function are separated. The list controller means 68 can be made from standard RAM devices, while the timeslot utilization means 66 is a special content addressable memory with additional circuits for doing a revolving window search and column resetting of bits at high speed. The connection list in the list controller memory means 77 will, for this example, be $16 k \times 6$ as before, but will not have any special capabilities for the timeslot search. Each group of 64 locations will provide the source identifier for each of the 64 outputs related to one cell period. The timeslot utilization means 66 and list controller means 68 together form a scheduler which has FIFO characteristics for cells to be transferred between any input and output pair but will reorder cells as necessary to avoid source or destination blocking. However, because ATM virtual connections have a predefined path through the network and the reordering will not change the order of any cells between a given input port and a given output port, there will be no reordering of cells visible to the user.

Sixty-four ports and 256 timeslots were chosen arbitrarily for this description. The port size, in reality, will reflect the number of physical ports in the system and the number of timeslots will be chosen according to technology capabilities and system requirements on throughput and blocking. Additional registers can be added to pipeline the process and considerations can be made to concatenate several devices to extend the port count and/or the number of timeslots available for pre-scheduling.

Figure 7:
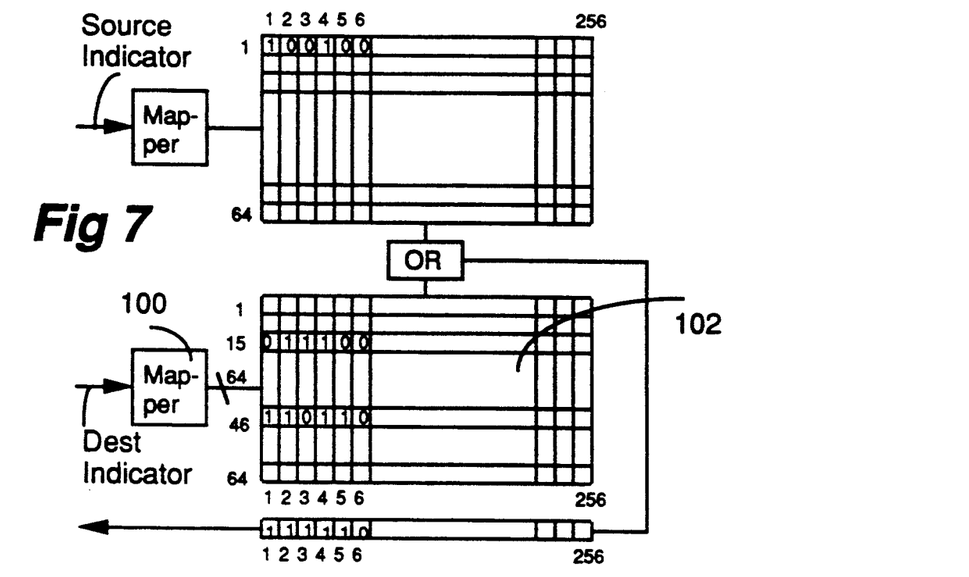
FIG. 7 is a schematic illustration of the scheduler employing a multicast feature according to yet another embodiment of the present invention.

FIG. 7 illustrates another modified embodiment of the invention. In ATM cells, the destination indicator is a value that has no direct relationship to the port number of a switch that it may pass through. However, the switch will have means to interpret the destination indicator and queue the cell according to the output(s) it will be transferred to. The queuing according to output can be done in several ways, depending on the design of the switch. In a common memory switch, with care, the cell pointer can be put into the output queue for each output it must be transferred to. An input buffered system could use the same technique (implemented differently) but the input bandwidth to the space switch is a valuable commodity which adds to the blocking factor of the switch. The crosspoint switch, alone or in an array, is capable of controlled multicast. With care, multi-cast cells can be transferred from the input buffer to all intended outputs in a single cell period, thus maximizing the switch efficiency. The communication from an input buffer means to the scheduler, as mentioned earlier, is the destination indication. In the embodiment shown in FIG. 7, where the mapper concept is illustrated, the destination indicator is applied to a mapper 100 which provides a bit for each output represented by the destination indicator. This multicast map is applied to the destination selection of the output port utilization array 102. As before, each data bit of each selected row will contribute to the column data. Now, as many as 65 rows (1 input and 64 outputs) may be selected to contribute to the solution. By doing multiple row selects of the output port utilization array 102, the resulting function will be a map of timeslots where the one input and all the selected outputs are available in the same timeslot.

Figure 8:
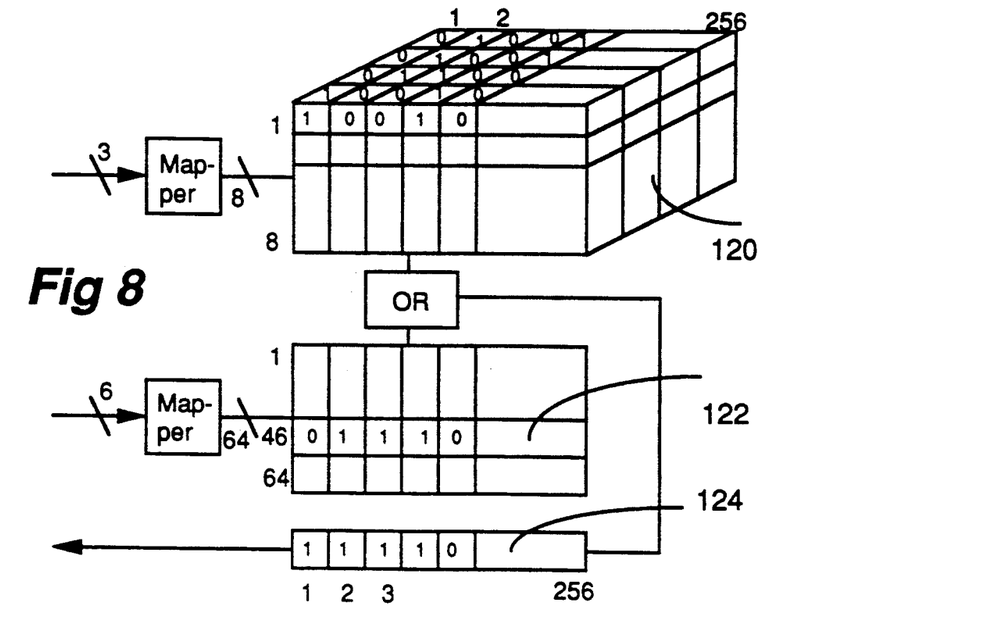
FIG. 8 is a schematic illustration of the scheduler of a switch having grouped inputs according to still another embodiment of the present invention.

Referring to FIG. 8, according to yet another embodiment of the invention, the input ports are grouped by using a series of the common memories as in the case of the embodiment shown in FIG. 3 and the timeslot utilization concept of FIG. 6 is applied to the system scheduler. Any cell in a common memory can be presented on any of the outputs of that group, i.e. a pooling of storage and of output resources. Thus in FIG. 8, the input port utilization array 120 can view the common memory port card as a single port with n times the output bandwidth (n=8 in this example). If the cells are assigned to the output ports of that group sequentially, then the utilization of that input buffer group can be represented with a binary number. For example, a 4 bit number in a column of a matrix would represent the accumulated assignment count for an 8 output grouped input buffer where 0 (0000 binary) represents no outputs assigned, and 8 (1000 binary) represents all outputs assigned. Note that only the high order bit of the count needs to be examined to denote availability of an output channel in the port card, that is to say, if bit 3=0, then less than 8 channels are assigned. This grouping of inputs of 8 alters the controller as in the figure. The controller is only aware of 8 sources where each one has 8 channels into the space switch. The selected source contributes its high order bit from its usage count and the selected destination(s) drives its component. The result, similar to FIG. 6, is a 256×1 array 124 which is then encoded to provide the timeslot number. When an output of a group is used, the count for that group and timeslot is incremented. Referring back momentarily to FIG. 3, each port card has 8 ports and a common memory where data waits to be transmitted on an output link. Routing information is extracted from the cell and fed to the buffer manager 38. The manager manages the RAM by keeping lists of pointers to data that are to be transferred to their respective output ports.

Figure 9:
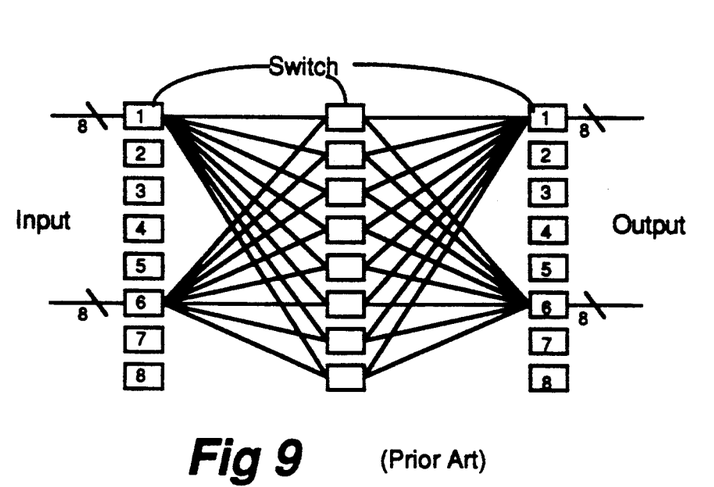
FIG. 9 is a schematic diagram of a known junctured space switch.
Figure 10:
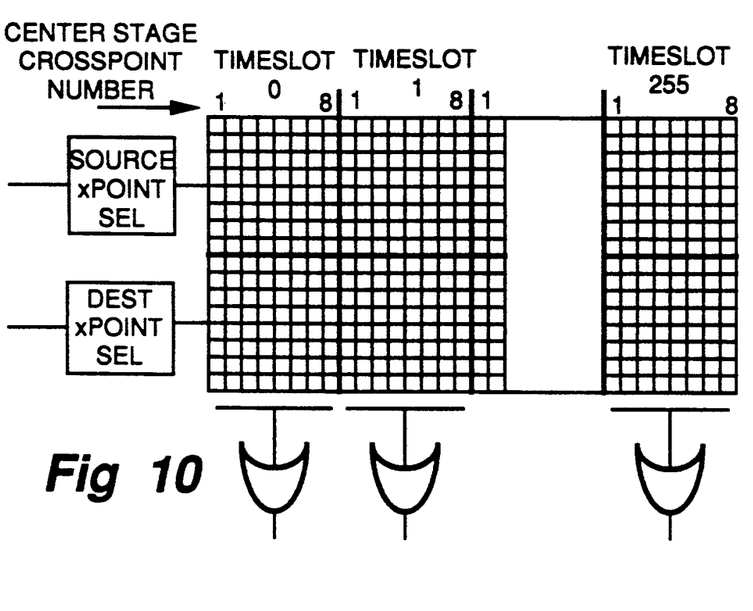
FIG. 10 is an illustration of the timeslot utilization logic which can be used to support the 256 port junctured space switch of FIG. 9.
Figure 11:
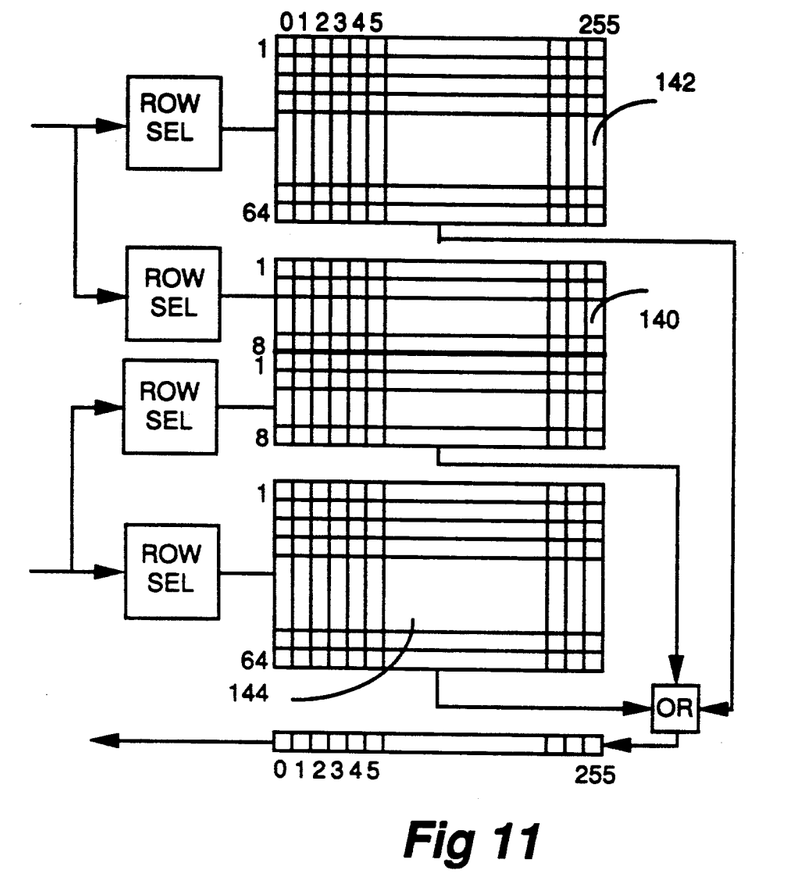
FIG. 11 is a schematic illustration of the timeslot utilization prescheduler concept applied to an input buffered switch feeding a junctured space switch according to still a further embodiment of the present invention.

Reference is now made to FIGS. 9, 10 and 11 in which further embodiments of the present invention are illustrated. If the space switch is non blocking (crosspoint or self routing space array), then no consideration needs to be given to blocking when the scheduling is done. However, in a blocking switch like the three stage junctured switch shown in FIG. 9, it may be necessary to ensure that a path is available through the space switch at the time of scheduling. According to another embodiment of the present invention, the concept of the timeslot utilization can be applied to select available connecting paths through a junctured space switch. The controller only has to determine if there is at least one possible path between selected input and output ports and, if so, identify it.

In the 64×64 system using 8×8 crosspoints, represented in FIG. 9, there are 8 possible paths between any input and any output. That is to say, any one of the 8 centre stage crosspoints can be used to build the connection. An idle input at the centre stage implies that the respective output of the previous stage is also idle. Similarly, an idle output at the centre stage implies that the respective input at the following stage is also idle. On the assumption that there is available bandwidth on the input and output of the space switch, then all that must be determined is whether the connection can be made through the centre stage of the switch.

FIG. 10 shows schematically an example of the logic required to find an available connecting path through the space switch. For each timeslot, each of the eight columns provides the status of the input and output of a center stage crosspoint. For example, source row 3 of column 5 would represent the connection path between input crosspoint 3 and centre crosspoint 5, and similarly destination row 7 of column 5 would represent the path between centre crosspoint 5 and output crosspoint 7. The crosspoints connected to the source and destination ports are used to select the two rows of the array. Each row selected will, for each timeslot, provide the status of the eight paths out of or into that crosspoint respectively. If a path out of the source crosspoint to a centre stage crosspoint indicates idle while the corresponding output of the same crosspoint to the destination crosspoint is also idle, then an idle will be indicated for that timeslot and, using encoder means, the center crosspoint can be identified.

FIG. 11 illustrates the utilization array for the junctured space switch applied to the 64×64 input buffered switch (no grouping of input ports). The input and output utilization arrays are the same as described previously. The OR function for each timeslot now has three inputs instead of two. The results of including this crosspoint utilization array with the input and output utilization arrays will ensure a connection from input to output and a route through the junctured space switch.

It is also possible that the input ports may be grouped by using groups of common memories as in the embodiment of FIG. 6. Broadcast can also be implemented with the junctured switch utilization map in a similar fashion to that shown in FIG. 7.

We claim:

1. An ATM switching system for switching data composed in ATM cells between a plurality of input ports and a plurality of output ports in timeslots according to the header of each cell comprising:

buffer memory means connected to said plurality of input ports for storing cells of data received therefrom;

space switch means having switchable connection paths for connecting said buffer memory means and said output ports for each cell;

timeslot utilization means connected to said buffer memory means, and including an input port utilization array, an output port utilization array and a crosspoint utilization array which indicate usage of all future timeslots of each input port, output port and connection path respectively and revolving window priority encoder means for determining the earliest commonly available timeslot among said future timeslots for connection paths between an input port and one or more output ports selected according to the header of a cell stored in said buffer memory means; and list controller means connected to said buffer memory means, said timeslot utilization means and said space switch means for storing said earliest commonly available timeslot together with information about said input port, selected output ports and said connection paths and for configuring at every timeslot said space switch means for said connection paths according to the header of each cell.

2. The ATM switching system for switching data composed in ATM cells, according to claim 1, wherein:
said input port, output port and crosspoint utilization arrays are bit map memories whose memory locations are assigned to a predetermined number of timeslots of said input ports, output ports and connection paths, the bit in each memory location indicating whether or not each of said input ports, output ports and connection paths at each timeslot is in use.

3. The ATM switching system for switching data composed in ATM cells, according to claim 2, wherein:
said timeslot utilization means further comprises logic means for logical operation among said input port, output port and crosspoint utilization arrays for generating an indication of commonly available timeslots for said input ports, output ports and connection paths.

4. The ATM switching system for switching data composed in ATM cells, according to claim 3, wherein:
said revolving window priority encoder means searching in a wrap-round fashion for the earliest commonly available timeslot in said indication with respect to a current timeslot.

5. The ATM switching system for switching data composed in ATM cells, according to claim 4, wherein:
said timeslot utilization means further comprises input row selector means, output row selector means, crosspoint input and crosspoint output row selector means for selecting memory locations in said bit map memories assigned to said input port, its requested output ports, input side and output side of said space switch means respectively, according to said header of each cell.

6. The ATM switching system for switching data composed in ATM cells, according to claim 5, wherein said list controller means comprises RAM for storing sets of information concerning said input ports, their requested output ports input side and output side of said space switch means and their earliest commonly available timeslots.

7. The ATM switching system for switching data composed in ATM cells, according to claim 1 wherein:
said input and output port utilization arrays are memories whose memory locations are assigned to a predetermined number of timeslots of said input ports and output ports, the bit in each memory location indicating whether or not each of said input ports and said output ports at each timeslot is in use.

8. The ATM switching system for switching data composed in ATM cells, according to claim 7, wherein:
said timeslot utilization means further comprises logic means for logical operation between said input and output port utilization arrays for generating an indication of commonly available timeslots for said input and output ports.

9. The ATM switching system for switching data composed in ATM cells, according to claim 8, wherein:
said revolving window priority encoder means searching in a wrap-round fashion for the earliest commonly available timeslot in said indication with respect to a current timeslot.

10. The ATM switching system for switching data composed in ATM cells, according to claim 9, wherein:
said timeslot utilization means further comprises input row selector means and output row selector means for selecting memory locations in said memories assigned to said input port and its requested output ports, according to said header of each cell.

11. The ATM switching system for switching data composed in ATM cells, according to claim 10, wherein:
said output row selector means selects a plurality of memory locations representing more than one output port, according to the header of the cell.

12. The ATM switching system for switching data composed in ATM cells, according to claim 10, wherein said list controller means comprises RAM for storing sets of information concerning said input ports, their requested output ports and their earliest commonly available timeslots.

* * * * *